United States Patent [19]
Whittaker

[11] Patent Number: 5,820,959
[45] Date of Patent: Oct. 13, 1998

[54] CORRUGATOR FABRIC

[75] Inventor: Ronald Whittaker, Rossendale, United Kingdom

[73] Assignee: Scapa Group PLC, Blackburn, United Kingdom

[21] Appl. No.: 737,696

[22] PCT Filed: May 17, 1995

[86] PCT No.: PCT/GB95/01111

§ 371 Date: Jan. 28, 1997

§ 102(e) Date: Jan. 28, 1997

[87] PCT Pub. No.: WO95/33095

PCT Pub. Date: Dec. 7, 1995

[30] Foreign Application Priority Data

May 26, 1994 [GB] United Kingdom .................. 9410599

[51] Int. Cl.[6] ....................................................... B32B 3/00
[52] U.S. Cl. ........................... 428/61; 156/157; 156/258; 156/264; 156/304.3; 156/304.5; 156/304.7; 428/57; 428/102; 428/223
[58] Field of Search ................................ 428/57, 61, 102, 428/223; 156/137, 157, 304.3, 304.5, 304.7, 258, 264

[56] References Cited

U.S. PATENT DOCUMENTS

| | | | |
|---|---|---|---|
| 2,165,772 | 7/1939 | Walsh et al. ................................. | 28/4 |
| 3,331,140 | 7/1967 | Bernard ....................................... | 34/95 |
| 4,364,421 | 12/1982 | Martin ................................. | 139/383 A |

FOREIGN PATENT DOCUMENTS

| | | |
|---|---|---|
| 0 218 569 | 4/1987 | European Pat. Off. . |
| 1958737 | 5/1971 | Germany . |
| 24 37 303 | 2/1976 | Germany . |
| 3637179 | 5/1987 | Germany . |
| 1255999 | 12/1967 | United Kingdom . |
| 2202873 | 10/1988 | United Kingdom . |
| WO8903300 | 4/1989 | WIPO . |

*Primary Examiner*—James J. Bell
*Attorney, Agent, or Firm*—Jacobson, Price, Holman & Stern, PLLC

[57] ABSTRACT

A corrugator fabric comprising a first basecloth having a first staple fiber layer secured to the lower face thereof and a second staple fiber layer secured to the upper face thereof, a second basecloth having a lower face secured to the second staple fiber layer and optionally the first basecloth, a third staple fiber layer secured to the upper face of the second basecloth, a jointing body to form a seam for said fabric and a seam flap including at least one basecloth covering said jointing body.

41 Claims, 2 Drawing Sheets

CORRUGATOR FABRIC

BACKGROUND OF THE INVENTION

The present invention relates to corrugator fabrics.

Known corrugator fabrics generally comprise either a wholly woven material or a single basecloth having a batt of staple fibres needled to the upper and lower faces thereof. The two ends of the fabric are connected so as to form an endless belt.

Woven corrugator belts generally have a good resistance to compaction and abrasion, but suffer from very low permeability, typically less than 3 cfm at 0.5" water gauge pressure, because of the complex multiply weave designs needed to achieve the required belt thickness of 8 to 10 mm. Because of the low permeability water vapour cannot easily escape through the belt. This reduces the speed of drying of the starch based adhesive used in the corrugator process. Furthermore, difficulties are encountered in forming a covered seam in a woven belt which is the same thickness as the rest of the belt. This results in marking of the board transported by the belt.

Known corrugator belts comprising a needled batt or a basecloth have an increased permeability, typically 10–15 cfm at 0.5" water gauge pressure compared to woven belts, but the needling process results in predominantly vertically orientated fibre tufts in the batt layer. Resistance to compaction and abrasion is not as good as that of woven belts.

Reduction in belt thickness either by compaction or abrasion can result in reduced bond strength between the outer liners and centre flute of the corrugated board pressed by the belt. Compaction of the belt reduces the thickness of the staple fibre layer. This can be particularly problematic when different board widths are being processed, the edges of the belt becoming more compacted than the middle portion. This is because narrow boards do not protect the edges of the belt while the belt passes over the heat plates of the corrugator machine.

Non-marking seams can readily be made with these nonwoven belts. The belt is split within the needled batt layer thereby forming a flap to the joint. Such flaps are necessarily weak. The fibres in the flap are not secured to a basecloth and the flap is dimensionally unstable and prone to abrasive wear and tearing.

SUMMARY OF THE INVENTION

The present invention has been made from a consideration of the aforementioned problems.

According to a first aspect of the present invention there is provided a corrugator fabric comprising a first basecloth having a staple fibre layer secured to the lower face thereof and a second staple fibre layer secured to the upper face thereof, wherein the lower face of a second basecloth is secured to the second staple fibre layer and optionally the first basecloth, and a third staple fibre layers is secured to the upper face of the second basecloth, the fabric further characterised by a seam flap, wherein the seem flap comprises at least one basecloth.

According to a second aspect of the present invention there is provided a method of making a corrugator fabric comprising the steps of securing a first staple fibre layer to one face of a first basecloth, securing a second staple fibre layer to the opposite face of the first basecloth, securing a first face of a second basecloth to the second staple fibre layer and optionally to the first basecloth and securing a third staple fibre layer to a second face of the second basecloth, and forming a seam flap, wherein the seam flap comprises at least one basecloth.

The first and third staple layers may be secured in position at any time during the manufacture of the fabric. However, in a preferred embodiment of the invention the first layer of staple fibres as previously defined is actually applied to the fabric after the previous layers have been secured in place. The first staple fibre layer is secured in place, after having first inverted the fabric.

The fabric may contain one or more further basecloths and a corresponding number of further staple fibre layers.

The construction of the corrugator fabric of the invention exhibits high resilience, which provides good resistance to compaction. The construction of the fabric enables high permeabilities to be achieved, i.e. at least 15 cfm 0.5" WG, preferably at least 20 cfm 0.5" WG and ideally 30–40 cfm 0.5" WG. This permeability is as much as three to five times greater than that of current needle felt designs.

By needling the fibres through two or more basecloths the length of the vertical fibre tufts is reduced thus improving the resistance to compaction. Furthermore this needling improves the anchorage of the fibre tufts, consequently reducing fibre shedding and providing better abrasion resistance.

The construction also exhibits high dimensional stability in both the machine and cross machine directions. Thus the fabric exhibits good resistance to length stretch and width spread.

The problems of known seamed felts are also addressed by the present invention. A section of the central staple fibre layer is removed from both fabric ends so as to define channels. A jointing body is received and is secured in place in each channel, the jointing body being of a substantially complementary shape to the channel in which it is located. It is noted that a base fabric extends above the channel and another base fabric extends between channel lines overcoming the problems associated with known flap designs.

The jointing bodies preferably comprise interdigitable loop forming formations which in combination with a hinge wire form a seam. The flaps of fabric extending above and below the seam contain the basecloths which are generally incompressible woven filament structures. Thus the flap strength and abrasion resistance will be far greater than that for seam flaps comprising only needled batt. Hence the potential for marking of the board is reduced and the life of the fabric is increased significantly.

The jointing bodies may be secured in place by way of adhesive such as an epoxy resin adhesive, for example the adhesive marketed under the registered trade mark Araldite. The jointing bodies are preferably bonded to both the top and base of the portions of the fabric ends defining the channel. The bond strength of the seams should preferably be more than 76 kg/cm and ideally be at least 80 kg/cm.

The jointing bodies may alternatively or additionally be secured in place by stitching in the cross machine direction although this would require stitching through the entire thickness of the fabric. The stitching yarn may comprise Nomex (trade mark) yarn. The strength of the stitching is vastly improved by feeding adhesive into the area of stitch insertions in order to plug the area around the stitch insertions. Thus even if the stitching is worn away or becomes pulled out in the cross machine direction the residual adhesive resin will impart strength. This is advantageous in that the stitching is vulnerable to friction and abrasion from weight rollers on which starch is deposited and cured.

The jointing bodies may comprise connecting loops such as narrow metal clips or spiral yarns made for example from polyester, optionally coated with polyamide or polyurethane. The connecting loops may be connected to a length of fabric and are preferably secured thereto with adhesive such as an epoxy adhesive.

A preferred type of jointing body comprises a woven monofilament fabric which is folded back on itself. A number of weft yarns are subsequently removed from the folded region so as to provide a loop.

A similar structure may be provided from a composite construction made for example by moulding in accordance with GB 2202873 LEFKOWITZ. Here warp yarns are incorporated into the structure and are folded back forming a series of loops at the fold. The matrix polymer used to produce such a structure may include any suitable material such as polyurethane or polyamide. There is one drawback with this arrangement in that if the material is secured in place by stitching as no cross machine direction threads are provided under load the sewing might act to cut through the matrix when the seam is under load. In order to surmount this potential problem a number of cross machine direction yarns may be included in the structure. This may be achieved by inserting a woven cloth between the loop forming machine-direction yarns.

The base fabric may be knitted or made from a composite construction for example in accordance with GB 2202873 LEFKOWITZ. However the base fabric is preferably woven and comprises multifilament or plied monofilament/multifilament yarns in the machine (warp) direction and monofilament yarns in the cross-machine (weft) direction. The yarns in the warp direction impart strength, stability (stretch resistance), resistance to compaction and anchorage of needled batt fibres. The monofilament cross machine direction yarns provide resistance to compaction and width spread. The basecloths preferably have an open construction. Therefore the permeability of the fabric is increased. The fabrics of the invention are generally far more open than conventional corrugator fabrics which comprise a single heavy basecloth. Furthermore the use of two relatively light basecloths rather than one relatively heavy basecloth means that the fabric is easier to manufacture in that the basecloths are easier to handle.

Preferably coarse staple fibres are used at least in the central layer, for example fibres having a titer, or blends of fibres having an average titer, above say 20 dtex. Coarse fibres have a greater resistance to compaction. Fibres or blends of fibres having an average titer in the range from 25 to 40 dtex are preferred, ideally the average titer is substantially 28 dtex. The fibres can be polyester, polyamide, polyacrylonitrile or blends thereof. Self-crimping fibres, i.e. staple fibres that undergo substantial crimping on application of heat. e.g. bicomponent polyester/copolyester fibres may also be used. Finer fibres may optionally be used in the outer staple fibre layers which are in contact with the board surface.

Each of said staple fibre layers preferably comprises a number of individual batts of fibre.

Singeing and/or resin treatment may also be applied to further improve compaction and abrasion resistance. The fabric may also be calendered and/or the face may be ground to improve thickness accuracy.

BRIEF DESCRIPTION OF THE DRAWINGS

In order that the present invention may be more readily understood a specific embodiment thereof will now be described by way of example only with reference to the accompanying drawings in which.

DETAILED DESCRIPTION OF THE PREFERRED EMBODIMENTS OF THE INVENTION

Figure 1:
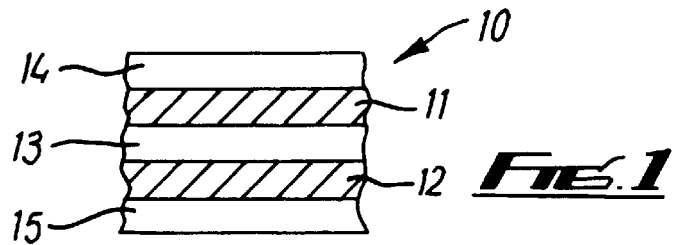
FIG. 1 is a side elevation of part of a corrugator fabric in accordance with the present invention.

Referring to FIG. 1 a corrugator fabric 10 comprises two base fabrics 11, 12 having a central staple fibre layer 13 therebetween. Further staple fibre layers 14, 15 are provided on the upper and lower faces of the fabric.

The central fibre layer 13 is made from polyester fibres having a titer of 28 dtex or a blend of polyester fibres having titers of 44 dtex and 17 dtex respectively. Finer staple fibres may be used for the outer batt layers.

The base fabrics are woven from plied monofilament/multifilament warp yarns and monofilament weft yarns. A typical warp yarn comprises three twisted yarns, each comprising two 1100 dtex TREVIRA (trade mark) multifilament twisted with 100 dtex TREVIRA (trade mark) monofilament. A typical weft yarn is 0.5 mm TREVIRA (trade mark) multifilament. Each base cloth preferably has a unit weight in the order of 840 g/m$^2$.

The corrugator fabric has a thickness of 9±1 mm, a unit weight of 2800–4500 g/m$^2$ and a density of 0.35–0.45 g/cm$^3$. The permeability of the fabric is greater than 30 cfm at 0.5" water gauge pressure.

Figure 2:
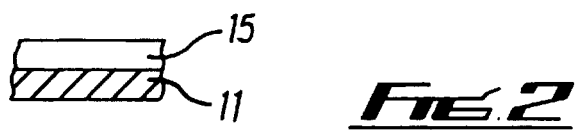
FIGS. 2 to 4 show the fabric of FIG. 1 during manufacture.
Figure 3:
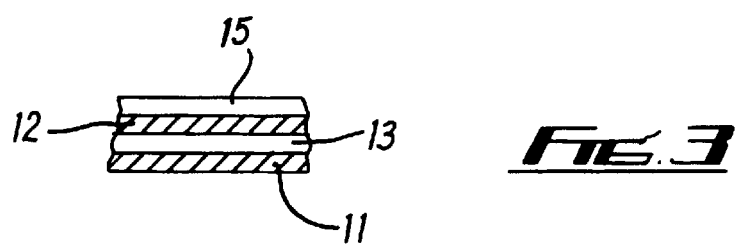
Figure 4:
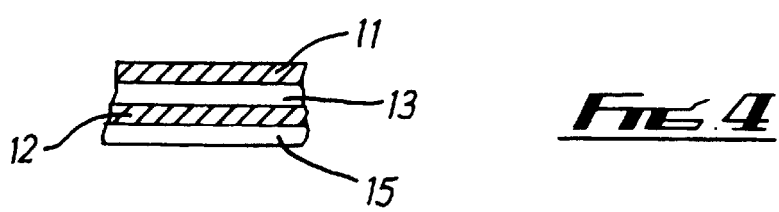

The fabric of the invention may be made by first needling a layer of fibres 13 onto a first base cloth 11 which is laid flat as shown in FIG. 2. A second base cloth 12, preferably of the same construction as the first basecloth 11 is then laid over the face of the first basecloth 11 having the staple layer of fibres 13 needled thereto. A layer of fibres 15 is then secured to the second basecloth 12 as shown in FIG. 3. The needling secures the second basecloth 12 to the first basecloth 11 and first staple fibre layer 13. The entire fabric is then turned over as shown in FIG. 4 and a further layer of fibres 14 is needled to the fibre free side of the first basecloth. The two ends of the fabric are then joined together to form an endless belt.

It is noted that each layer of staple fibres as previously described may comprise a number of individual batts. Preferably four layers of batt are laid during each needling stage.

Figure 5:
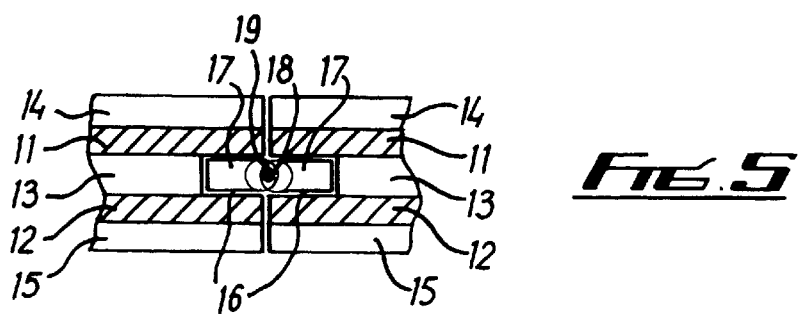
FIG. 5 shows the two ends of the corrugator fabric of FIG. 1 being joined together so as to bring the fabric into endless form.

FIG. 5 shows the two ends of the fabric of FIG. 1 which are jointed together to form an endless belt. Here a channel 16 is removed out of each end of the central staple fibre layer and a jointing body 17 of complementary shape to the channel is received in each channel and secured in place by adhesive. A set of clips 19 is connected to each jointing body. In use the two sets of clips are interdigitated and a hinge wire 18 is passed therethrough. It is noted that the ends of the flaps are not aligned with the hinge wire. The arrangement described above provides virtually no marking in use and has a good bond strength.

Figure 6:
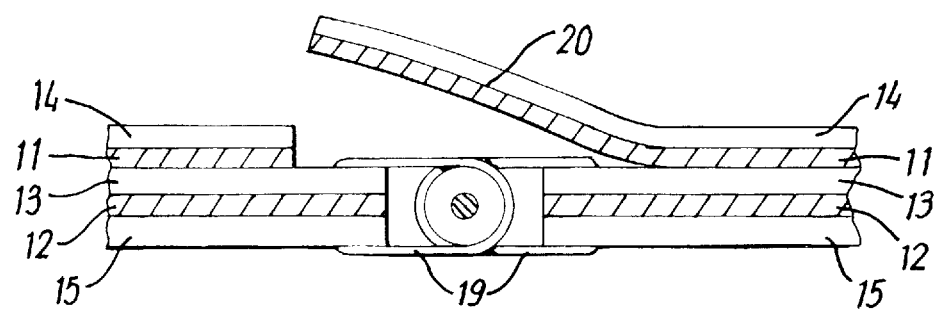
FIG. 6 shows a different manner of joining the two ends of the corrugator belt together.

FIG. 6 shows a further method of jointing the two ends of the fabric so as to form a belt. Here the ends of the clips 19 are embedded in the two lower staple fibre layers 13, 15 and the lower base cloth 12. A flap 20 extends over the seam. This flap 20 consists of the upper basecloth 11 and staple fibre layer 14. The incorporation of the basecloth 14 in the flap 20 avoids the problems associated with known flap designs.

Figure 7:
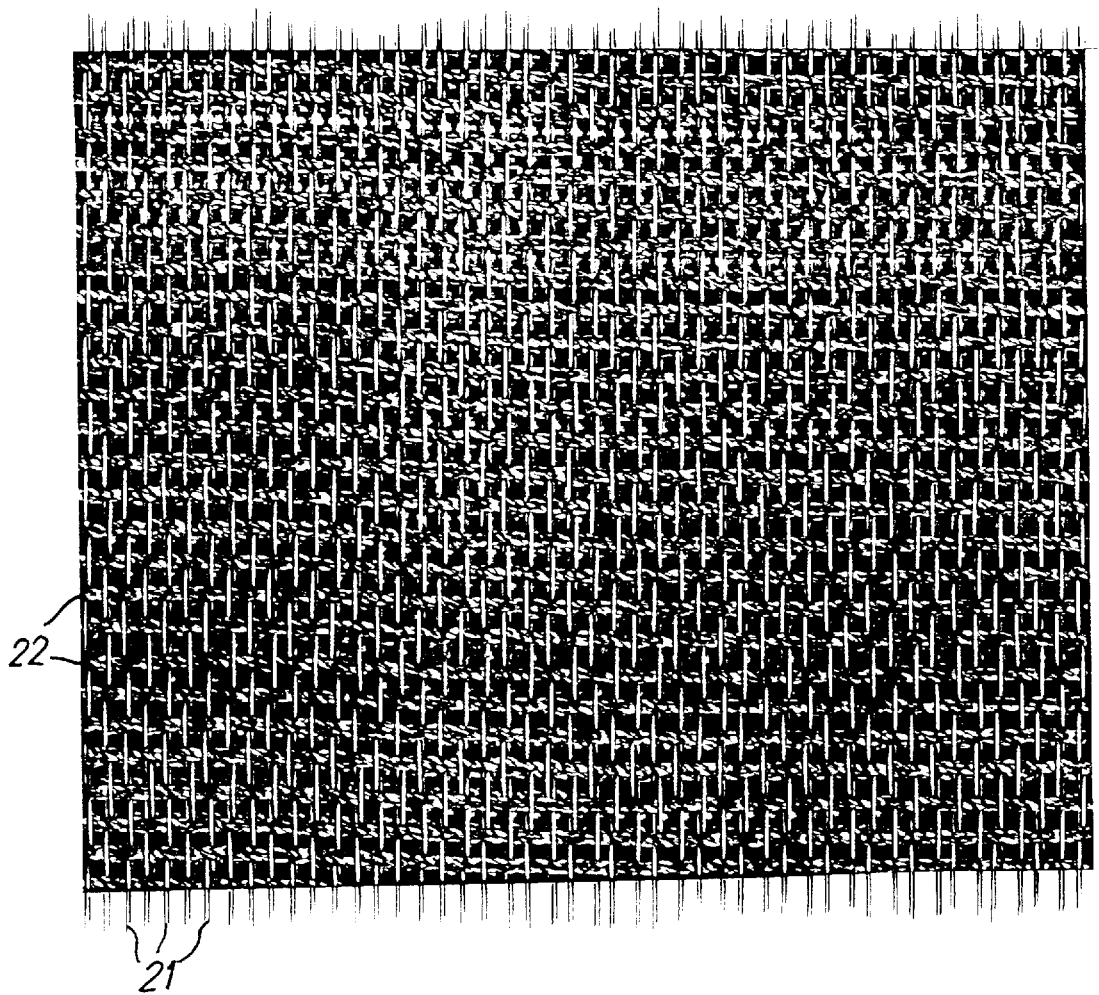
FIG. 7 is a plan view of the basecloth shown in FIGS. 1 to 6.

FIG. 7 illustrates a typical basecloth for incorporation in the fibres of the present invention. The basecloth is woven from monofilament wefts 21 and composite multifilament and monofilament warps 22. The warps comprise three pairs of monofilament/multifilament yarns twisted together, the three pairs of yarns being cabled to provide a single warp. It is noted that the weave of the base cloth is much more open than conventional woven cloths so as to provide enhanced permeability.

It is to be understood that the above described embodiments have been made by way of illustration only. Many modifications and variations are possible.

I claim:

1. A corrugator fabric comprising a first basecloth having a first staple fibre layer secured to the lower face thereof and a second staple fibre layer secured to the upper face thereof, a second basecloth having a lower face secured to the second staple fibre layer and optionally the first basecloth, a third staple fibre layer secured to the upper face of the second basecloth, a jointing body to form a seam for said fabric and a seam flap including at least one basecloth covering said jointing body.

2. A corrugator fabric as claimed in claim 1, wherein the fabric comprises at least one further basecloth.

3. A corrugator fabric as claimed in claim 1, wherein the fabric comprises at least one further staple fibre layer.

4. A corrugator fabric as claimed in claim 1, wherein the fabric has a permeability of at least 15 cfm 0.5" WG.

5. A corrugator fabric as claimed in claim 1, wherein the fabric has a permeability of at least 20 cfm 0.5" WG.

6. A corrugator fabric as claimed in claim 1, wherein the fabric has a permeability of at least 30 cfm 0.5" WG.

7. A corrugator fabric as claimed in claim 1, wherein the fabric has a permeability of at least 40 cfm 0.5" WG.

8. A corrugator fabric as claimed in claim 1, wherein a section of the centre of said staple fibre layers is removed from each end of the fabric so as to define respective channels.

9. A corrugator fabric as claimed in claim 8, wherein the parts of the fabric defining the top and base of the channels each comprise at least one basecloth.

10. A corrugator fabric as claimed in claim 8, wherein a jointing body is received in each channel.

11. A corrugator fabric as claimed in claim 10, wherein the jointing bodies comprise interdigitable loop forming formations which in combination with a hinge form a seam.

12. A corrugator fabric as claimed in claim 11, wherein the loop forming formations comprise spirals, loops or yarns folded back so as to form a loop at the fold.

13. A corrugator fabric as claimed in claim 10, wherein the jointing bodies are secured in place by way of adhesive.

14. A corrugator fabric as claimed in claim 10, wherein the jointing bodies are secured in place by stitching.

15. A corrugator fabric comprising:
a first basecloth having an upper face and a lower face;
a first staple fibre secured to the lower face of said first basecloth;
a second staple fibre secured to the upper face of said first basecloth;
a second basecloth having a lower face secured to said second staple fibre layer and an upper layer;
a third staple fibre layer secured to the upper face of the second basecloth;
a seam flap formed from at least one basecloth;
a channel formed at least said second staple fibre layer; and, a jointing body located in said channel.

16. The fabric of claim 15, wherein said second basecloth is secured to said first basecloth.

17. The fabric of claim 15, wherein said seam flap comprises said second basecloth.

18. The fabric of claim 15, wherein said seam flap comprises said second basecloth and said third staple fibre.

19. The fabric of claim 15, wherein said jointing body is secured to said first and second basecloths.

20. A corrugator fabric as claimed in claim 15, wherein the fabric has a permeability of at least 14 cfm 0.5" WG.

21. A corrugator fabric comprising a first basecloth having a staple fibre layer secured to a lower face of the first basecloth and a second staple fibre layer secured to an upper face of the first basecloth, wherein a lower face of a second basecloth is secured to the second staple fibre layer and a third staple fibre layer is secured to an upper face of the second basecloth, a seam flap formed from at least one of said first and second basecloths, a channel formed in a center of said staple fibre layers, and a jointing body located in said channel.

22. The fabric of claim 21, wherein said jointing body is secured to said first and second basecloths.

23. The fabric of claim 21, wherein said second basecloth is secured to said first basecloth.

24. The fabric of claim 21, wherein said seam flap comprises said second basecloth.

25. The fabric of claim 21, wherein said seam flap comprises said second basecloth and said third staple fibre.

26. A corrugator fabric as claimed in claim 21, wherein the fabric has a permeability of at least 15 cfm 0.5" WG.

27. A method of making a corrugator fabric comprising the steps of securing a firsts staple fibre layer to one face of a first basecloth, securing a second staple fibre layer to the opposite face of the first basecloth, securing a first face of a second basecloth to the second staple fibre layer and optionally to the first basecloth and securing a third staple fibre layer to a second face of the second basecloth, and forming a seam flap, which includes at least one basecloth.

28. A method of making a corrugator fabric as claimed in claim 27, wherein the said first staple fibre layer is secured in place after the other of said staple fibre layers have been secured in place.

29. A method of making a corrugator fabric as claimed in claim 27, wherein the fabric comprises at least one further basecloth.

30. A method of making a corrugator fabric as claimed in claim 27, wherein the fabric comprises at least one further staple fibre layer.

31. A method of making a corrugator fabric as claimed in claim 27, wherein the fabric has a permeability of at least 15 cfm 0.5" WG.

32. A method of making a corrugator fabric as claimed in claim 27, wherein the fabric has a permeability of at least 20 cfm 0.5" WG.

33. A method of making a corrugator fabric as claimed in claim 27, wherein the fabric has a permeability of at least 30 cfm 0.5" WG.

34. A method of making a corrugator fabric as claimed in claim 27, wherein the fabric has a permeability of at least 40 cfm 0.5" WG.

35. A method of making a corrugator fabric as claimed in claim 27, wherein a section of the centre of said staple fibre layers is removed from each end of the fabric so as to define respective channels.

36. A method of making a corrugator fabric as claimed in claim 35, wherein the parts of the fabric defining the top and base of the channels each comprise at least one basecloth.

37. A method of making a corrugator fabric as claimed in claim 35, wherein a jointing body is received in each channel.

38. A method of making a corrugator fabric as claimed in claim 37, wherein the jointing bodies comprise interdigitable loop forming formations which in combination with a hinge wire form a seam.

39. A method of making a corrugator fabric as claimed in claim 38, wherein the loop forming formations comprise spirals, loops or yarns folded back so as to form a loop at the fold.

40. A method of making a corrugator fabric as claimed in claim 37, wherein the jointing bodies are secured in place by way of adhesive.

41. A method of making a corrugator fabric as claimed in claim 37, wherein the jointing bodies are secured in place by way of stitching.

* * * * *